US012241282B2

(12) United States Patent
Jensen

(10) Patent No.: US 12,241,282 B2
(45) Date of Patent: Mar. 4, 2025

(54) LOCKING DEVICE

(71) Applicant: STENDALS EL AB, Västerås (SE)

(72) Inventor: Lars Jensen, Surahammar (SE)

(73) Assignee: STENDALS EL AB, Västerås (SE)

( * ) Notice: Subject to any disclaimer, the term of this patent is extended or adjusted under 35 U.S.C. 154(b) by 612 days.

(21) Appl. No.: 17/610,333

(22) PCT Filed: May 14, 2020

(86) PCT No.: PCT/SE2020/050499
§ 371 (c)(1),
(2) Date: Nov. 10, 2021

(87) PCT Pub. No.: WO2020/236068
PCT Pub. Date: Nov. 26, 2020

(65) Prior Publication Data

US 2022/0259892 A1 Aug. 18, 2022

(30) Foreign Application Priority Data

May 17, 2019 (SE) .................................... 1950590-8
Dec. 20, 2019 (SE) .................................... 1951546-9

(51) Int. Cl.
*E05B 47/00* (2006.01)
*E05B 63/00* (2006.01)
(Continued)

(52) U.S. Cl.
CPC ...... *E05B 47/0012* (2013.01); *E05B 63/0013* (2013.01); *E05B 15/004* (2013.01);
(Continued)

(58) Field of Classification Search
CPC . Y10T 70/7107; E05B 47/00; E05B 47/0012; E05B 47/023; E05B 63/0013;
(Continued)

(56) References Cited

U.S. PATENT DOCUMENTS 2,447,190 A 8/1948 Lickteig
2,645,926 A 7/1953 Erkkil
(Continued)

FOREIGN PATENT DOCUMENTS

DE 202008013405 U1 1/2009
DE 102008016699 A1 10/2009
(Continued)

*Primary Examiner* — Suzanne L Barrett
(74) *Attorney, Agent, or Firm* — Dilworth & Barrese, LLP.

(57) ABSTRACT

The present invention relates to a locking device (10) for independently operating a bolt (20) by a mechanical activation and a non-mechanical activation, the locking device comprising a bolt (20), a first follower (61) that is pivotable on a first pivot and comprising a follower arm (68) that is configured to engage the bolt and move it between the extended position (A) and the retracted position (B), a second follower (63) that is configured to contact the first follower (61) and move the follower arm (68), and further comprising a activation element (30) for mechanical activation of the bolt, and a control assembly (80) for non-mechanical activation of the bolt, wherein further wherein the control assembly comprises a play (P) such that the second follower when operated by the activation element is configured to move freely in relation to the cam and wherein further the first pivot is the activation element.

10 Claims, 11 Drawing Sheets

Figure 1:
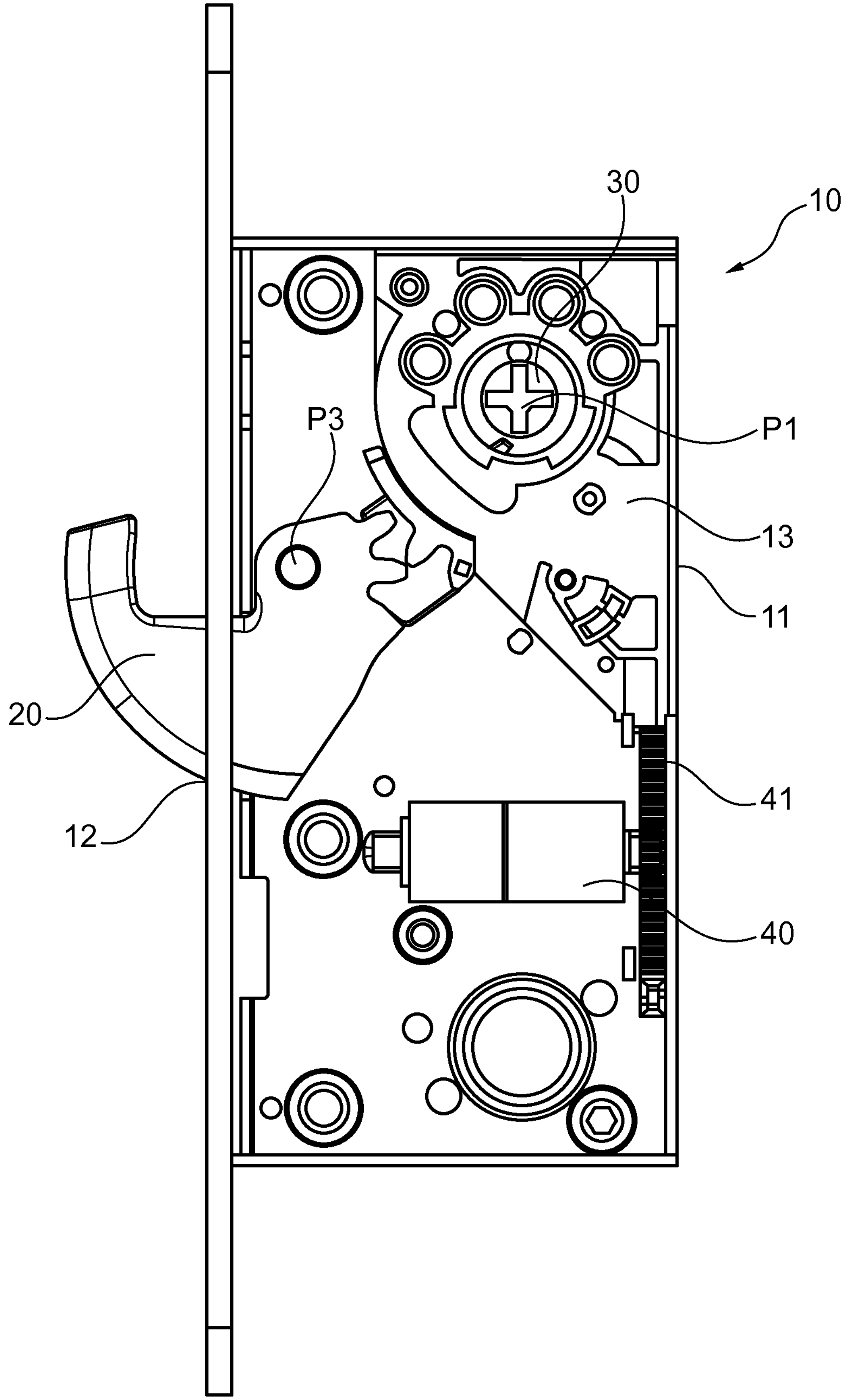

(51) Int. Cl.
*E05B 15/00* (2006.01)
*E05B 47/02* (2006.01)
*E05B 55/00* (2006.01)

(52) U.S. Cl.
CPC . *E05B 2047/002* (2013.01); *E05B 2047/0024* (2013.01); *E05B 2047/0069* (2013.01); *E05B 2047/0084* (2013.01); *E05B 2047/0094* (2013.01); *E05B 47/023* (2013.01); *E05B 55/00* (2013.01)

(58) Field of Classification Search
CPC .. E05B 15/004; E05B 55/00; E05B 2047/002; E05B 2047/0024; E05B 2047/0069; E05B 2047/0084; E05B 2047/0094
USPC .......................................................... 70/279.1
See application file for complete search history.

(56) References Cited

U.S. PATENT DOCUMENTS

| | | | | |
|---|---|---|---|---|
| 4,685,709 | A * | 8/1987 | Kambic | E05B 47/0012 292/201 |
| 4,843,851 | A | 7/1989 | Frolov | |
| 5,083,448 | A | 1/1992 | Kaerkkaeinen et al. | |
| 5,148,691 | A | 9/1992 | Walldén | |
| 2005/0172685 | A1 | 8/2005 | Keightly | |
| 2006/0144102 | A1 | 7/2006 | Keightley | |
| 2008/0190155 | A1 | 8/2008 | Kim | |
| 2009/0277231 | A1 * | 11/2009 | Kim | E05B 63/0013 70/336 |
| 2011/0036131 | A1 | 2/2011 | Chiou et al. | |
| 2011/0037278 | A1 | 2/2011 | Dynes et al. | |
| 2012/0000257 | A1 * | 1/2012 | Wheeler | E05C 9/042 70/91 |
| 2012/0292925 | A1 | 11/2012 | Lundberg et al. | |
| 2013/0192316 | A1 | 8/2013 | McKibben et al. | |
| 2013/0298617 | A1 | 11/2013 | Lambrou et al. | |
| 2017/0247912 | A1 | 8/2017 | Ando | |
| 2017/0321453 | A1 | 11/2017 | Zheng et al. | |

FOREIGN PATENT DOCUMENTS

| | | | | |
|---|---|---|---|---|
| EP | 0482588 | A1 | 4/1992 | |
| EP | 0537531 | A1 | 4/1993 | |
| EP | 1213425 | A1 | 6/2002 | |
| EP | 1353028 | A1 | 10/2003 | |
| EP | 1464781 | A2 | 10/2004 | |
| EP | 1921233 | A1 | 5/2008 | |
| EP | 2378039 | A2 * | 10/2011 | E05B 13/004 |
| EP | 2873790 | A1 * | 5/2015 | E05B 15/10 |
| EP | 3372757 | A1 | 9/2018 | |
| FR | 1355736 | A | 3/1964 | |
| SE | 440529 | B | 8/1985 | |
| SE | 463979 | B | 2/1991 | |
| SE | 533 873 | C2 | 2/2011 | |
| SE | 540893 | C2 | 10/2017 | |
| WO | 2012126039 | A1 | 9/2012 | |

* cited by examiner

LOCKING DEVICE

TECHNICAL FIELD

The present invention relates to a locking device for independently operating a bolt by a mechanical activation and a non-mechanical activation. The non-mechanical activation is suitably an electrical activation by an electrical motor or a magnetic activation by a coil.

BACKGROUND

Within the field of locking devices, constant improvements are required in order to develop locking devices that can fit multiple functions within a very limited space. One particularly interesting technical field is where a locking device is operable by mechanical means (i.e. by inserting a key and manually rotating a activation element or by pivoting a handle) and by non-mechanical means (i.e. by operating an electrical motor, or a coil for generating a magnetic field). In such locking devices, it is generally desirable that the different modes of operation can operate the same bolt independently of each other and without interfering or damaging each other.

At the same time, there is always a problem of fitting all components needed for such operation into the same locking device and making them robust and strong so that the force applied through mechanical activation or non-mechanical activation is used for its intended purpose and the locking device has a smooth operation.

One locking device within this technical field is shown by SE463979. However, that device requires many components that take up considerable space within the locking device.

Another locking device is shown by SE536933 but does not provide a solution where different modes of operation can be used independently of each other. This increases the risk of wear to sensitive components such as the electrical motor shown, and generally lowers the expected lifetime of the locking device.

There is therefore a need for a locking device that has both mechanical and non-mechanical activation, and that is compact and robust so that problems associated with the prior art can be overcome.

SUMMARY

The object of the present invention is to eliminate or at least to minimize the problems discussed above. This is achieved by a locking device according to the description herein.

The locking device is configured for independently operating a bolt by a mechanical activation and a non-mechanical activation, the locking device comprising

- a bolt that is movable between an extended position in a locked state and a retracted position in an unlocked state,
- a first follower for operating the bolt, the first follower being pivotable on a first pivot and comprising a follower arm that is configured to engage the bolt and move it between the extended position and the retracted position,
- a second follower for operating the first follower and thereby also the bolt, the second follower being configured to contact the first follower and move the follower arm
- an activation element for mechanical activation of the bolt, said activation element being rotatable and configured to operate the second follower,
- a control assembly for non-mechanical activation of the bolt, the control assembly comprising an actuator, a cam operated by the actuator and a coupler for coupling a movement of the cam to the second follower and thereby operate the second follower, wherein the control assembly comprises a play such that the second follower when operated by the activation element is configured to move freely in relation to the cam and wherein further the first pivot is the activation element such that the first follower is configured to rotate about the activation element.

Thereby, a locking device is achieved that is compact and robust as compared with the prior art, and where friction is kept low due to the use of few components that are also arranged to efficiently transfer a force applied in the mechanical or non-mechanical activation to moving the bolt in a controlled and energy efficient manner.

It is especially advantageous that the mechanical and non-mechanical activation of the bolt requires pivoting around only two pivots or less. This keeps energy losses due to friction to a minimum so that the force applied to the locking device by the mechanical or non-mechanical activation is transferred efficiently into controlling the position of the bolt. In one of the embodiments shown herein, only one pivot is required for both the mechanical and the non-mechanical activation.

If the bolt is a hook bolt, an additional pivot is required for the hook bolt to be able to pivot between the extended position and the retracted position.

The non-mechanical activation is preferably an electrical activation using an electrical motor as actuator or a magnetic activation using a coil as actuator. Other ways of activating the locking device in a non-mechanical way may suitably also be included within the scope of the present invention.

Suitably, the cam is connected to the coupler by a first connection, said first connection comprising the play. Thereby, the cam is not affected by any movements of the coupler due to a mechanical activation of the locking device.

Alternatively, the coupler comprises two coupler elements that form a second connection, said second connection comprising the play. Thereby, the cam is constantly coupled to or meshed with one of the coupler elements, allowing for the play to be provided in the coupler.

Suitably, the play is configured to allow a movement of the second follower from a first end position to a second end position and from the second end position to the first end position independently of the cam, wherein the first end position is a position corresponding to an extracted position of the bolt and the second end position is a position corresponding to a retracted position of the bolt. Thereby, the cam is unaffected of the movements of the second follower so that the non-mechanical activation is not affected by a mechanical activation of the locking device.

The coupler may comprise a toothed wheel rotatable on a second pivot and the second follower may comprise a rack that is arranged in constant mesh with the toothed wheel. Thereby, the transfer of force between the coupler and the second follower is performed in an efficient way.

Suitably, the coupler also comprises an activation wheel arranged on the second pivot and configured to operate the toothed wheel in order to control the second follower and thereby the follower arm of the first follower, said activation wheel being arranged in constant mesh with the cam, wherein the toothed wheel and the activation wheel are connected to each other in a second connection by one of them comprising a protrusion and the other comprising an opening into which the protrusion extends when the toothed wheel and the activation wheel are mounted together on the second pivot, wherein further the protrusion and opening are arranged in such a way that a rotation of the activation wheel causes the protrusion to contact a wall of the opening and thereby rotates the toothed wheel, and wherein the opening forms the play such that the toothed wheel can rotate driven by a mechanical activation of the first follower without causing the activation wheel to also rotate. This embodiment is highly efficient and stable, and provides low friction and a very low risk of malfunction or tampering by unauthorized persons. By providing the play between the wheels, the risk of components being misaligned or in other way moved so that the functioning of the locking device is no longer efficient is significantly decreased.

Suitably, the coupler may further comprise a third follower comprising a rack and being arranged in constant mesh with the toothed wheel, wherein the third follower is connected to the cam in a first connection by one of them comprising a protrusion and the other comprising an opening into which the protrusion extends when the third follower and the cam are arranged together, wherein further the protrusion and opening are arranged in such a way that a linear movement of the cam causes the protrusion to contact a wall of the opening and thereby causes a linear movement of the third follower, and wherein the opening forms the play such that the third follower can move linearly driven by a mechanical activation of the first follower without causing the cam to move also. This embodiment is also sturdy and stable and requires few components in order to perform all the desired functions. The play being provided between the cam and the third follower allows for a linear transfer of force which is advantageous in providing a smooth operation of the locking device.

Suitably, the coupler may provide that the toothed wheel and the cam are connected in a first connection by one of the comprising a protrusion and the other comprising an opening into which the protrusion extends when the toothed wheel is arranged on the second pivot and the cam is arranged beside the toothed wheel, wherein further the protrusion and the opening are arranged in such a way that a linear movement of the cam causes the protrusion to contact a wall of the opening and thereby causes a rotation of the toothed wheel, and wherein the opening forms the play such that the toothed wheel can rotate driven by a mechanical activation of the first follower without causing the cam to move also. This is a cost efficient and sturdy embodiment where the linear movement of the cam is transferred into a rotary movement of the wheel.

Suitably, the coupler may comprise a toothed section on the first follower, and a fourth follower comprising a rack and being arranged in constant mesh with the toothed section on the first follower, wherein the fourth follower is connected to the cam in a first connection by one of them comprising a protrusion and the other comprising an opening into which the protrusion extends when the fourth follower and the cam are arranged together, wherein further the protrusion and opening are arranged in such a way that a linear movement of the cam causes the protrusion to contact a wall of the opening and thereby causes a linear movement of the fourth follower, and wherein the opening forms the play such that the fourth follower can move linearly driven by a mechanical activation of the first follower without causing the cam to move also. This embodiment is even more compact and sturdy than the others and has only two pivots which allows for a highly space-efficient locking device while at the same time providing all the desired functions.

Many additional benefits and advantages of the present invention will be readily understood by the skilled person in view of the detailed description below.

DRAWINGS

Figure 2:
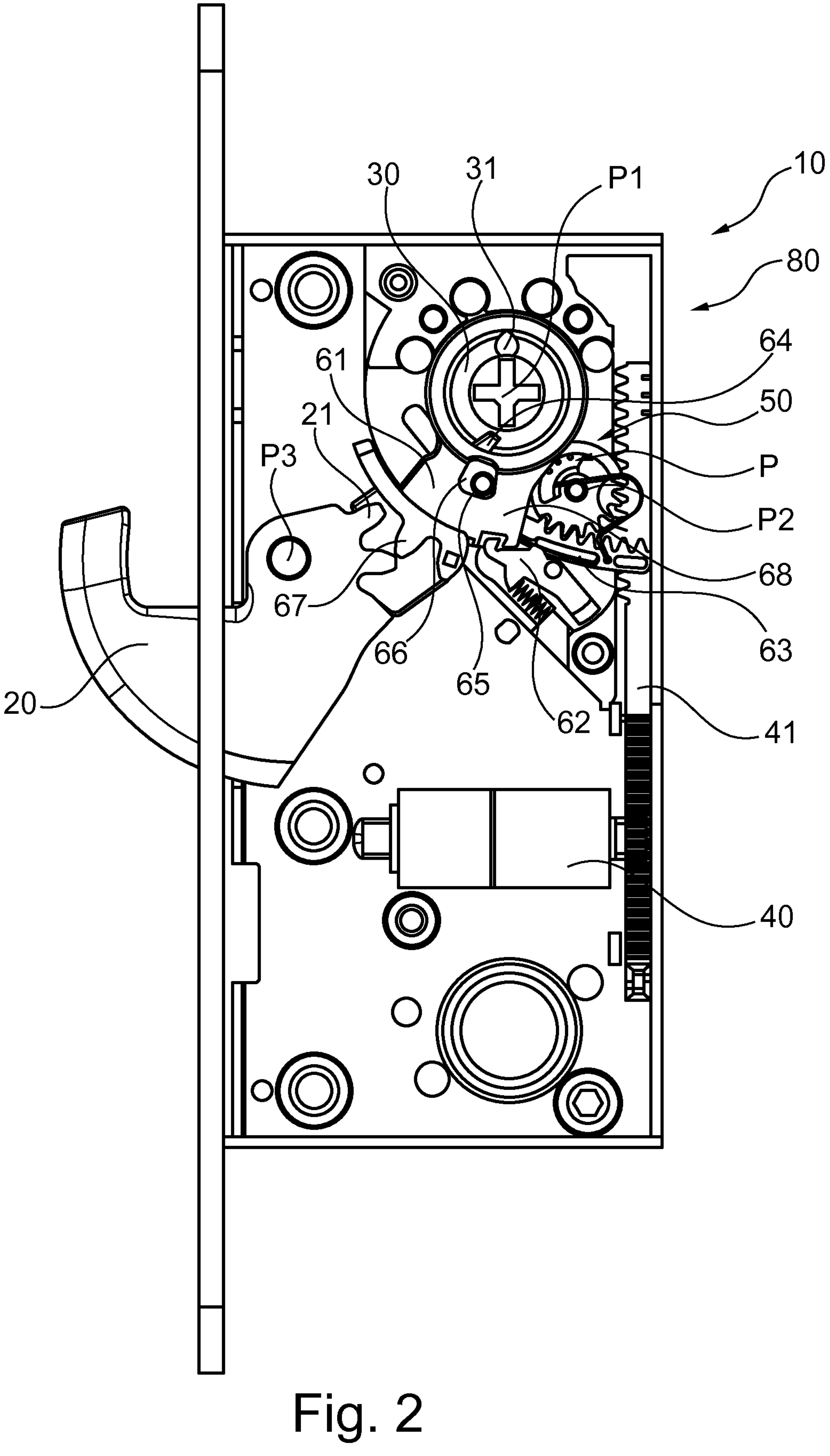
Figure 3A:
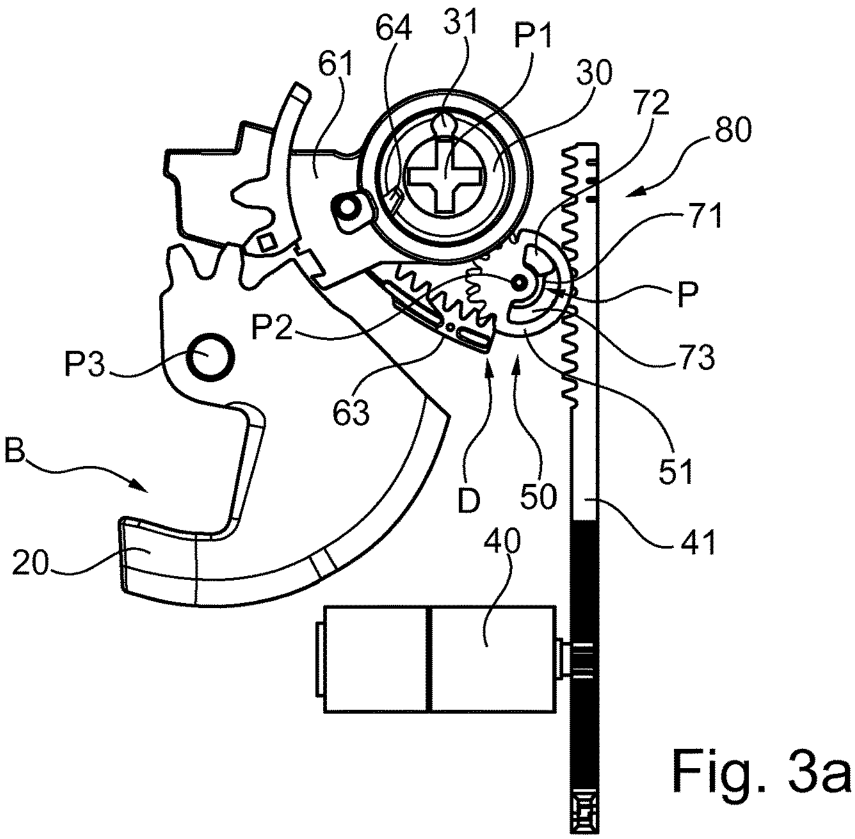
Figure 3B:
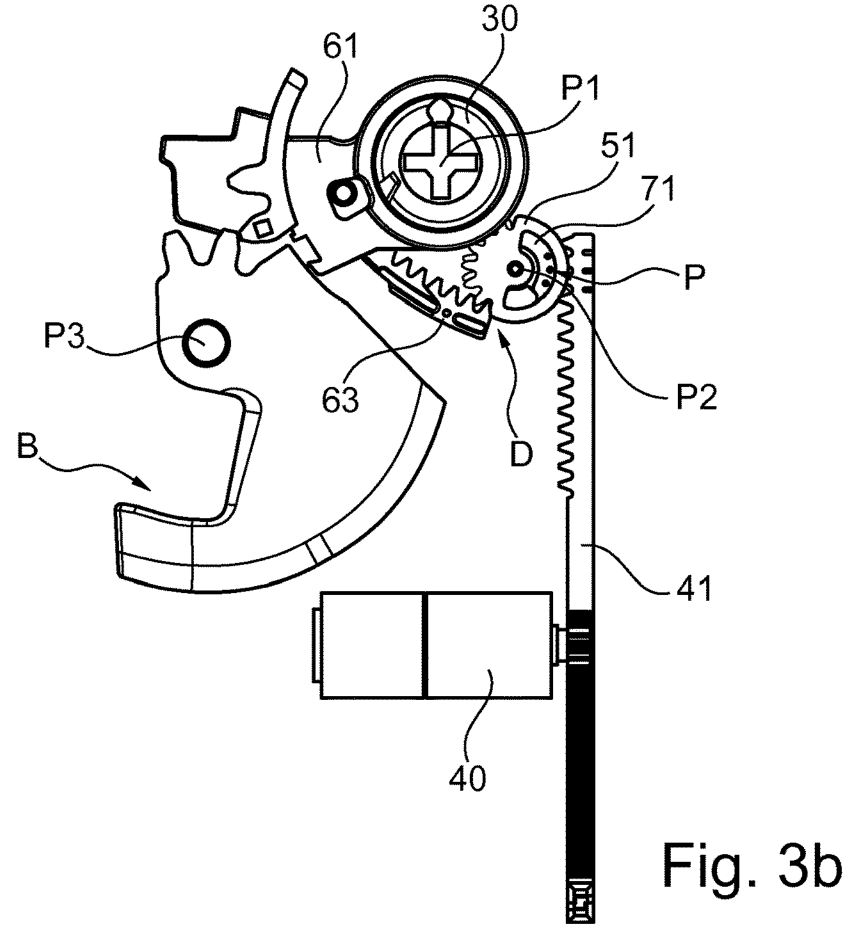
Figure 3C:
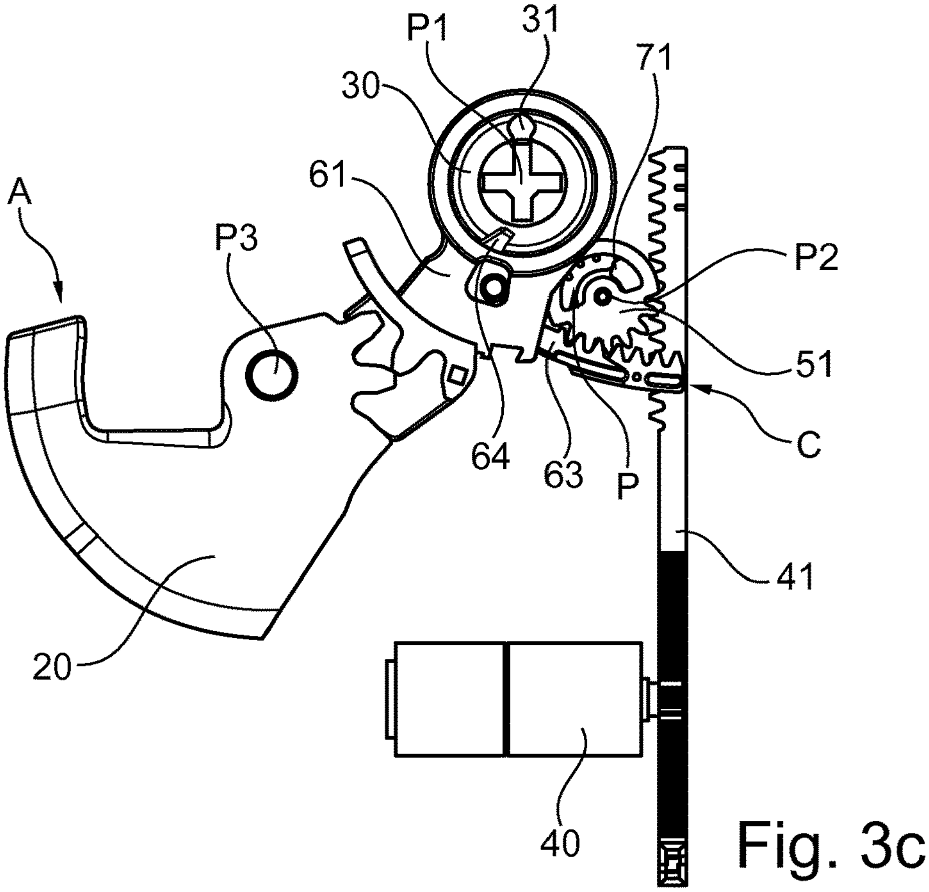
Figure 3D:
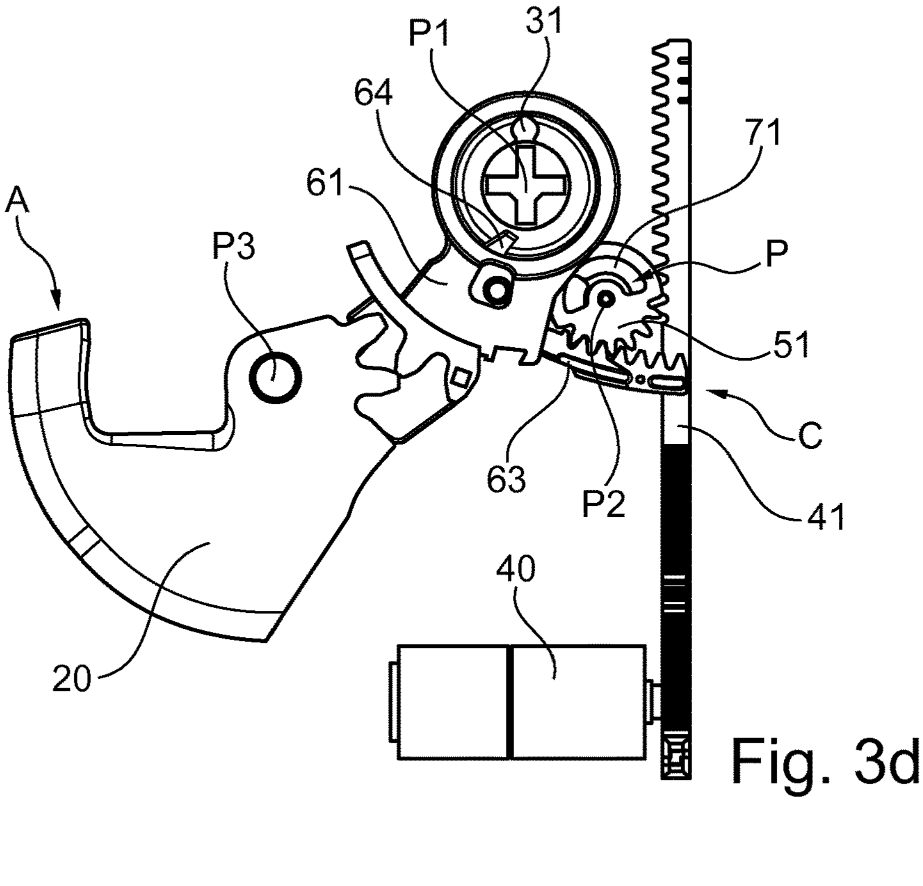
Figure 3E:
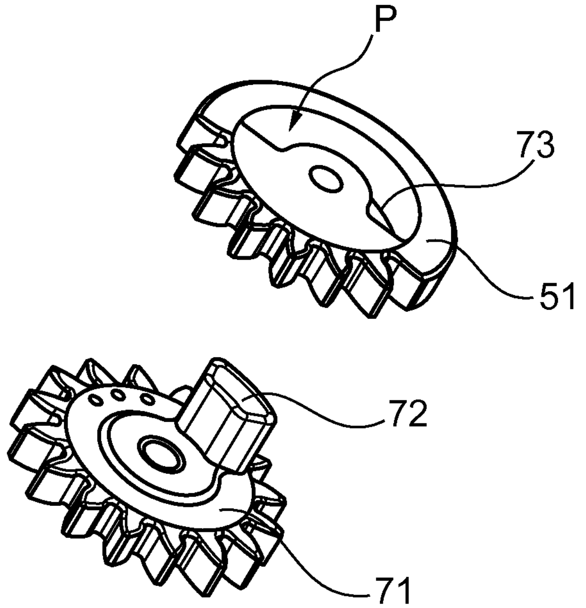
Figure 3F:
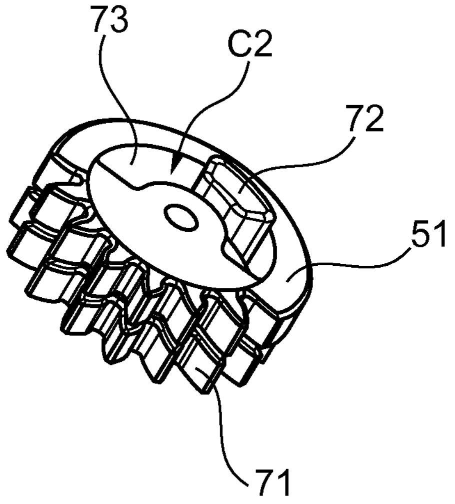
Figure 4A:
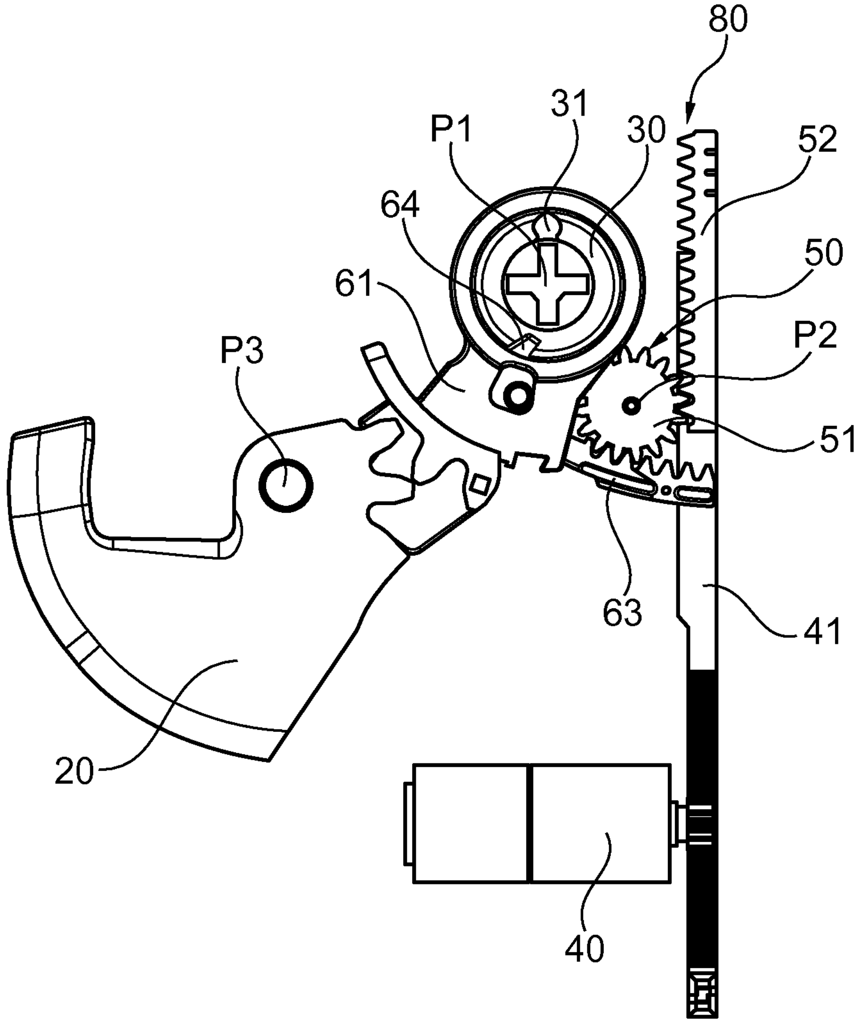
Figure 4B:
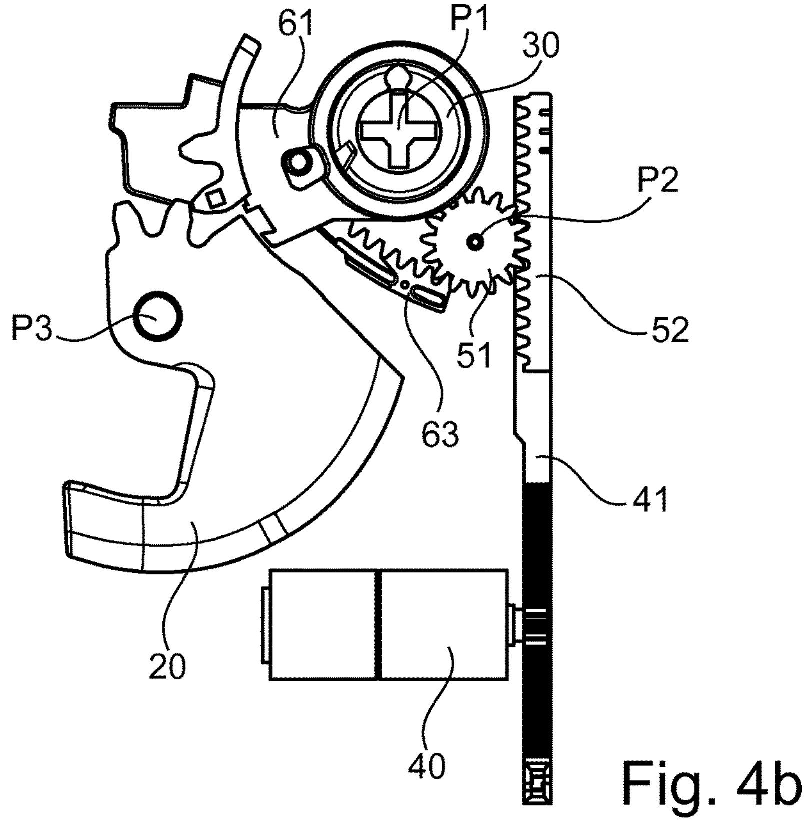
Figure 4C:
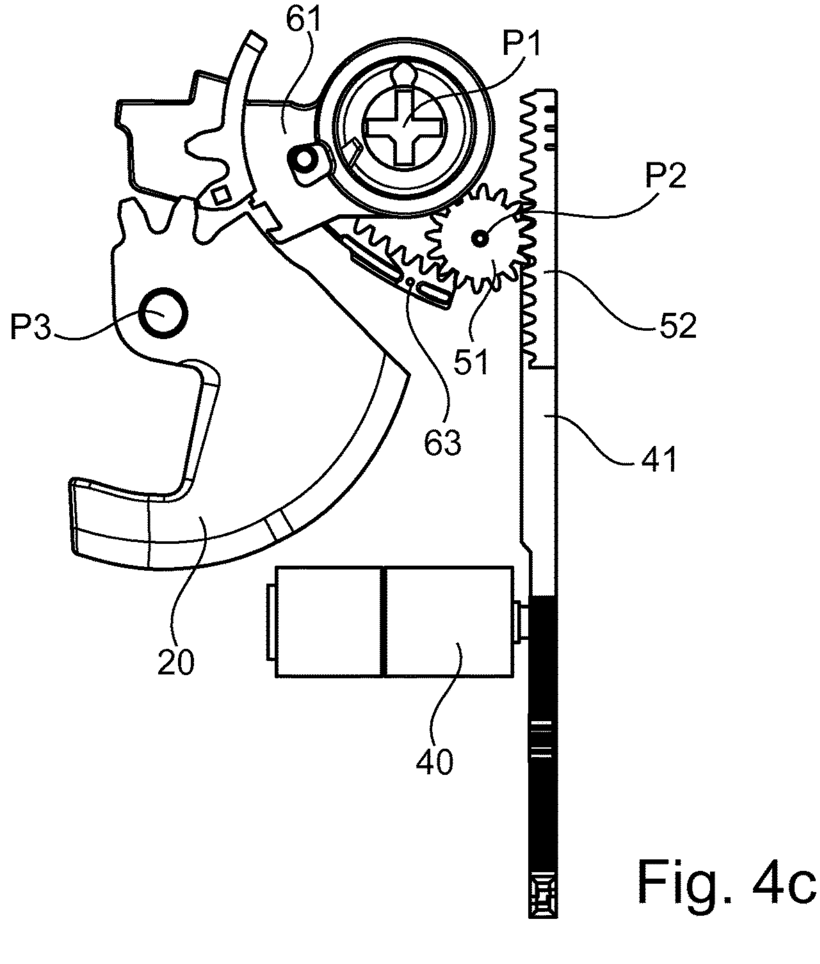
Figure 4D:
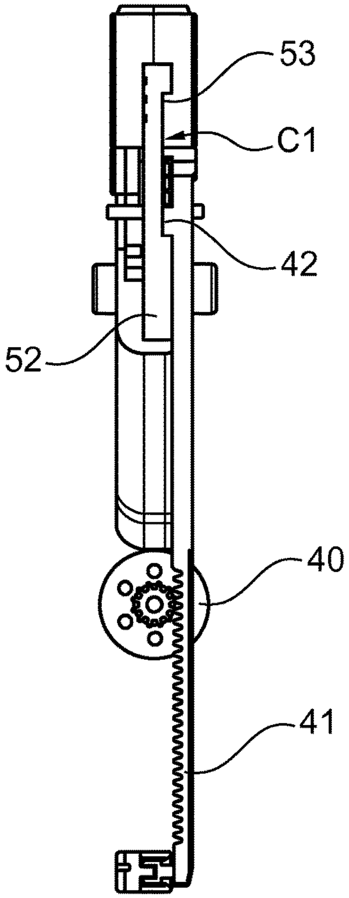

The invention will now be described in more detail with reference to the appended drawings, wherein FIG. 1 discloses a planar view locking device according to the present invention;

FIG. 2 discloses the locking device of FIG. 1 with an inner housing removed to display components of the locking device;

FIG. 3*a* discloses a planar view of a preferred embodiment of the invention in an open position with the cam in a neutral position;

FIG. 3*b* discloses a planar view of the embodiment of FIG. 3*a* in the open position with the cam moved down;

FIG. 3*c* discloses the embodiment of FIG. 3*a* in a locked position with the cam in a neutral position;

FIG. 3*d* discloses the embodiment of FIG. 3*a* in the locked position with the cam moved up;

FIG. 3*e* discloses a perspective view of the toothed wheel and the activation wheel;

FIG. 3*f* discloses a perspective view of the wheels of FIG. 3*e* mounted together;

FIG. 4*a* discloses a planar view of a second embodiment in the locked position with the cam in the neutral position;

FIG. 4*b* discloses the embodiment of FIG. 4*a* in the open position with the cam in the neutral position;

FIG. 4*c* discloses the embodiment of FIG. 4*a* in the open position with the cam moved down;

FIG. 4*d* discloses a planar view from the side of the embodiment of FIG. 4*a;*

Figure 4E:
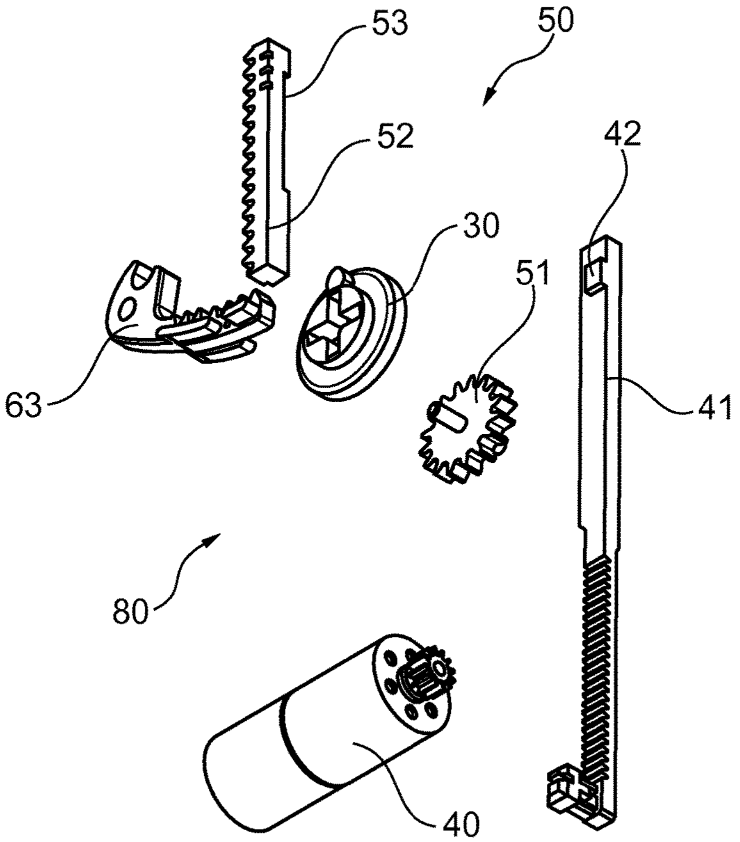

FIG. 4*e* discloses an exploded view of components of the embodiment of FIG. 4*a;*

Figure 5A:
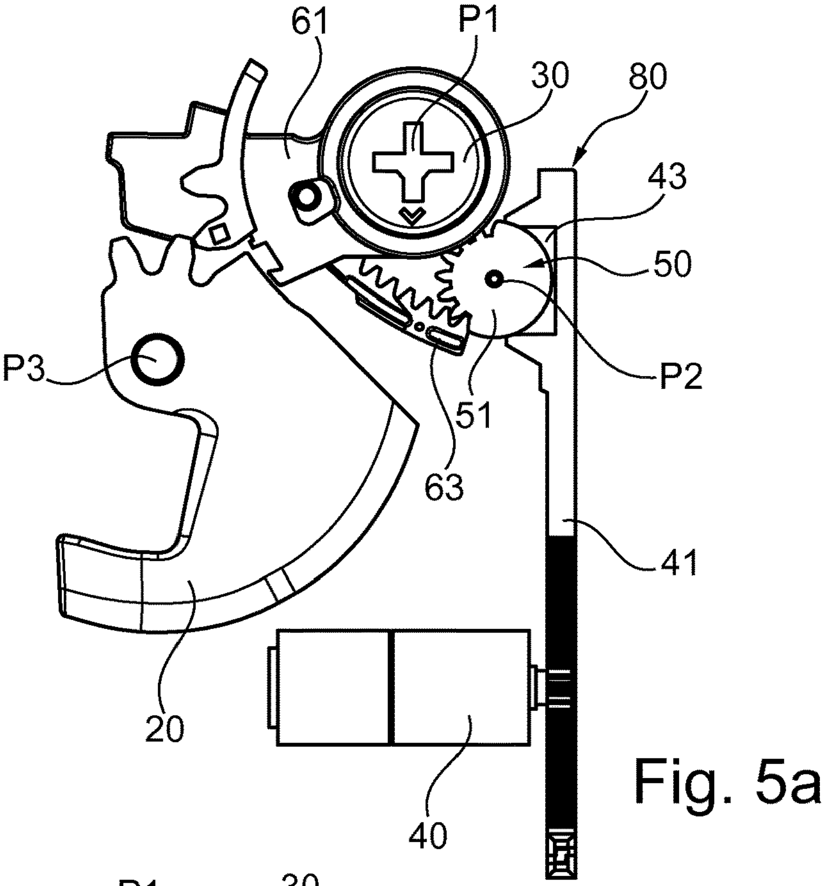
Figure 5B:
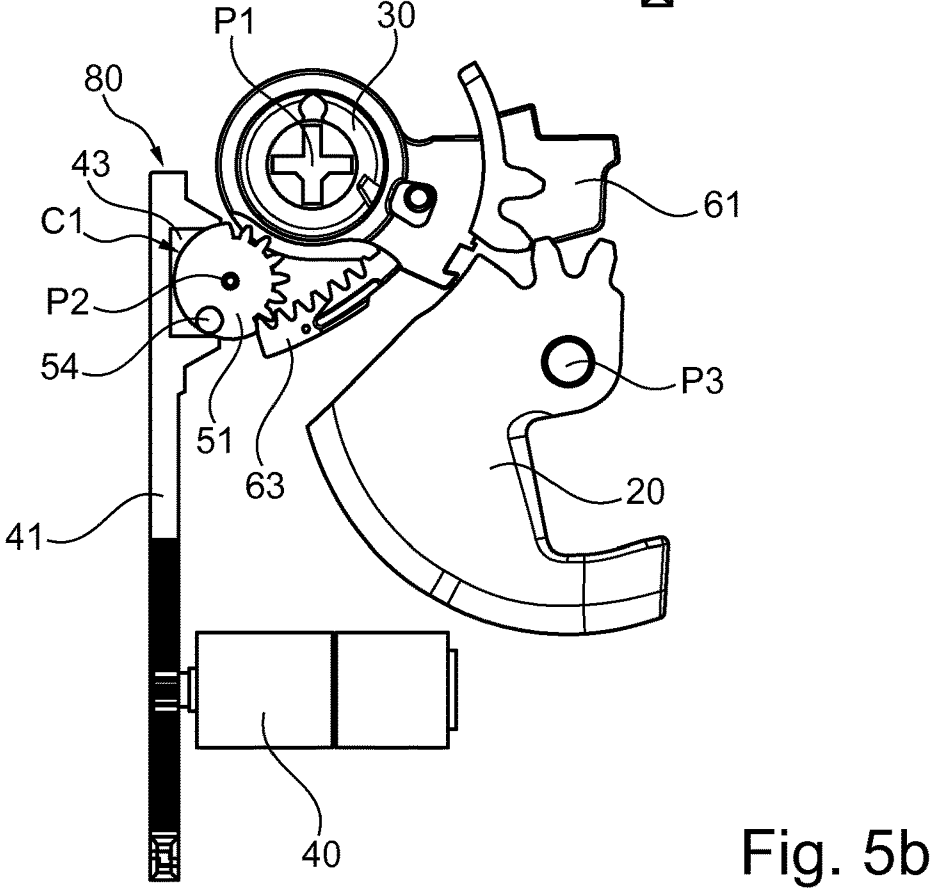
Figure 5C:
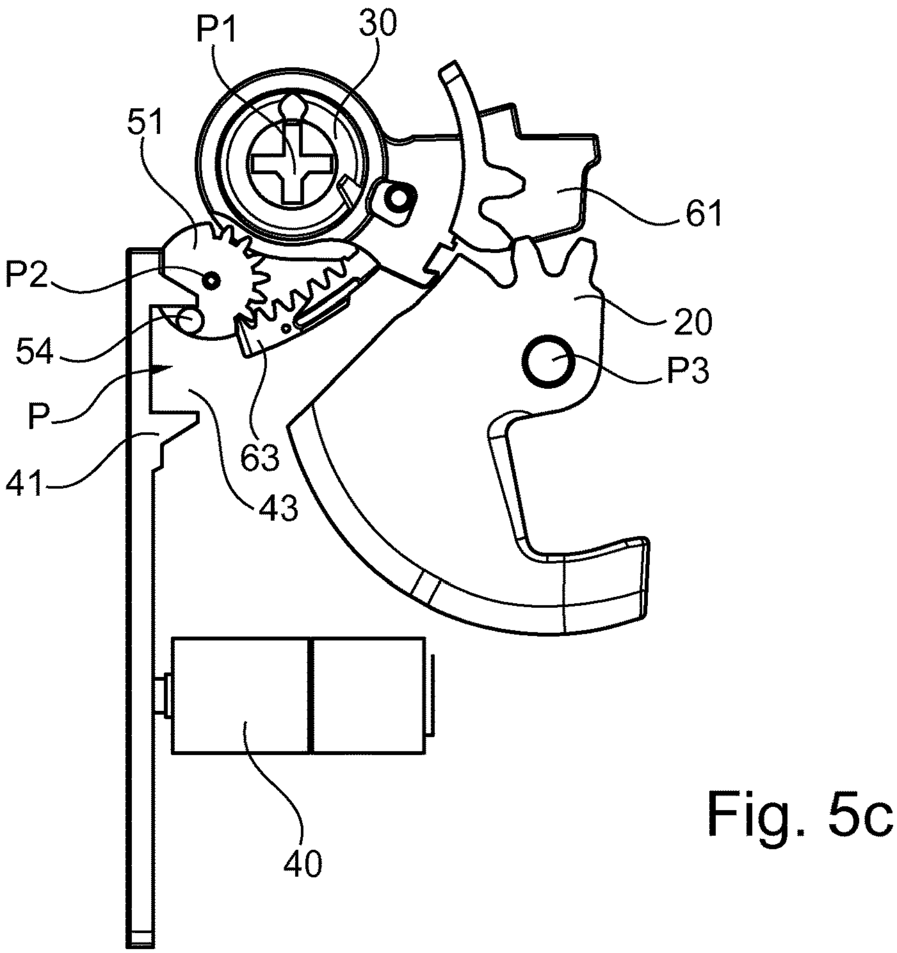
Figure 5D:
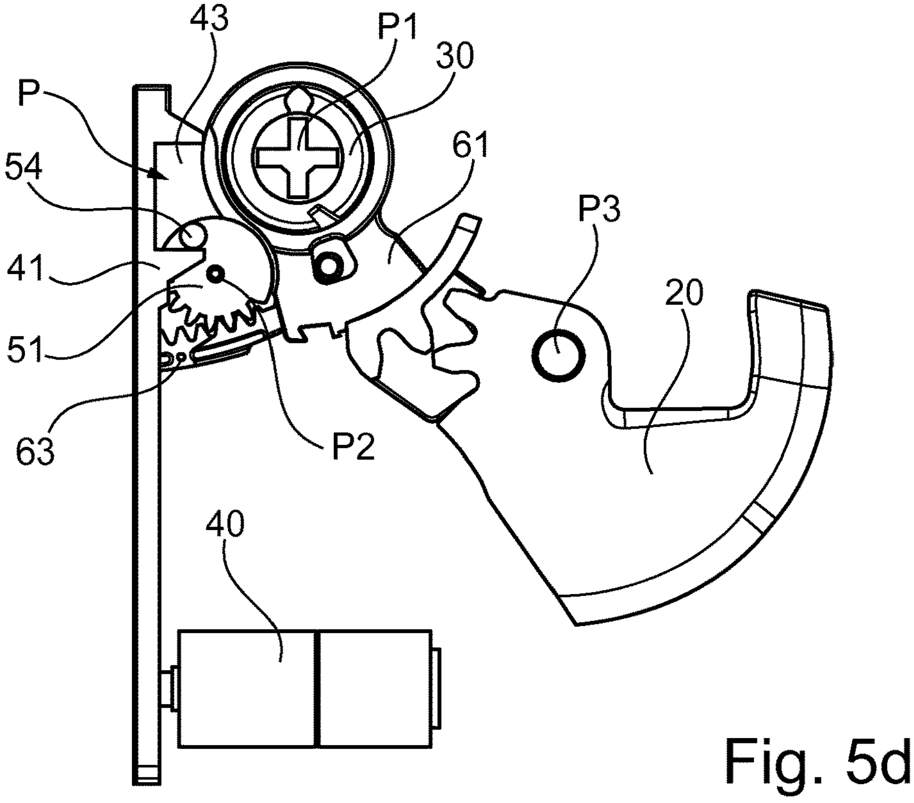
Figure 6C:
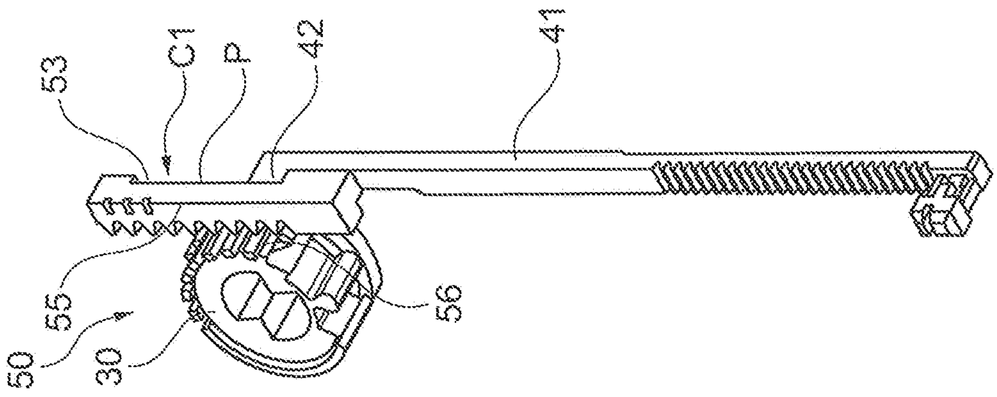
Figure 6B:
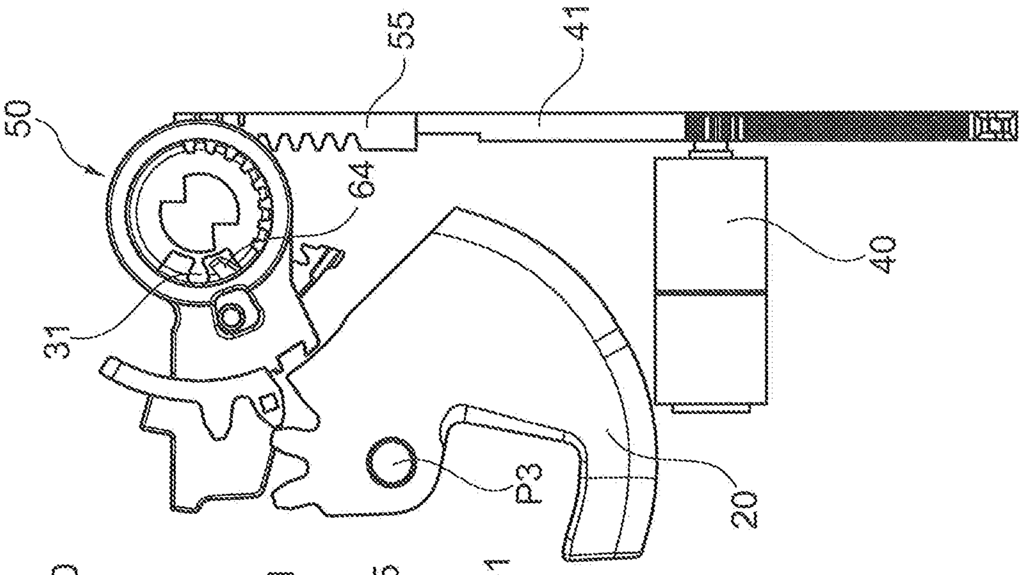
Figure 6A:
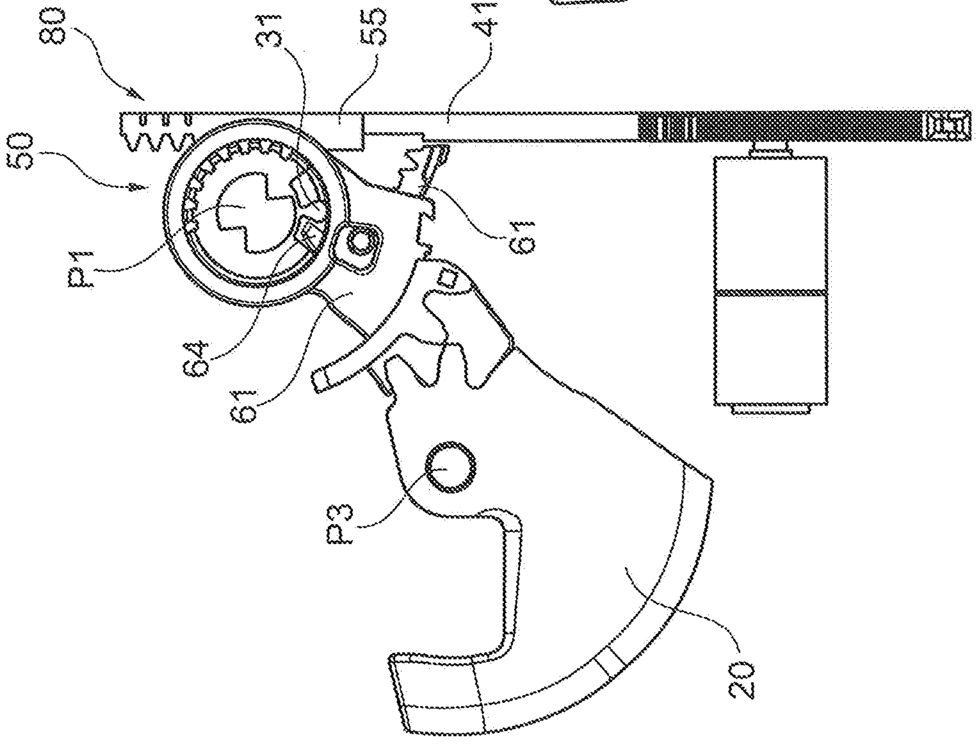

FIG. 5*a* discloses a planar view of a third embodiment of the invention in the open position with the cam in the neutral position;

FIG. 5*b* discloses the embodiment of FIG. 5*a* in a planar view from behind;

FIG. 5*c* discloses the embodiment of FIG. 5*a* from behind in the open position with the cam moved down;

FIG. 5*d* discloses the embodiment of FIG. 5*a* from behind in the locked position with the cam moved up;

FIG. 6*a* discloses a planar view of a fourth embodiment of the invention in the locked position with the cam in the neutral position;

FIG. 6*b* discloses the embodiment of FIG. 6*a* in the open position with the cam moved down; and FIG. 6*c* discloses a perspective view of the coupler of the embodiment of FIG. 6*a*.

DETAILED DESCRIPTION

The term play as used herein is defined as a connection between a first component and a second components wherein one of the components comprises a protrusion that extends into an opening of the other. The first component is able to move in relation to the second component and vice versa by the opening being larger than the protrusion, so that the opening and the protrusion can move in relation to each other without the protrusion contacting walls or edges of the opening. The embodiments of the present invention disclose the opening as a through hole of a component or as an indentation into a component, but each fulfil the same function of allowing one component to move in relation to the other.

FIG. 1 discloses a preferred embodiment of a locking device 10 according to the present invention. The locking device 10 comprises a plurality of components that are arranged in a housing 11 that has an opening 12 through which a bolt 20 can protrude in an extended position A that corresponds to a locked position of the locking device 10. The bolt 20 is in the embodiments shown herein disclosed as a hook bolt 20 that is pivotable from the extended position A to a retracted position B and back, but the bolt 20 could alternatively be a bolt that is arranged to move linearly or to pivot in another plane than that shown by the hook bolt of the figures. The locking devices disclosed herein and the mechanisms for mechanical and non-mechanical activation of the bolt can be used with any kind of bolt with only minor modification to the mechanisms, which will be readily understood by the skilled person.

Thus, the bolt 20 is a hook bolt that is arranged to pivot on a third pivot P3 and can be operated through a mechanical activation by rotating an activation element 30 that is arranged to rotate about a first pivot P1. The bolt 20 can also be operated through a non-mechanical activation by an actuator 40 acting on a cam 41. An inner housing 13 is arranged to conceal components of the locking device 10 and serves to prevent manipulation of the lock that could occur by insertion of manipulation tools through the opening 12. The non-mechanical activation is in the drawings shown in the form of an electrical activation where the actuator 40 is an electrical motor, but magnetic activation using a coil as the actuator 40 is an equally suitable solution and can be used with every embodiment described herein. Other non-mechanical activation means can also be used as long as they are able to control movement of a cam 41.

The activation element 30 is an element that is configured to rotate in response to a force applied by a person using the locking device. The activation element 30 is in some embodiments a cylinder into which a key can be inserted and rotated by hand. In other embodiments, the activation element 30 is instead a handle receiving element connected to a handle, emergency handle or knob that can be rotated by hand by the person. Other activation elements 30 can also be used with the present invention as long as they can receive a force applied by a person and transmit that force in the form of a rotary movement about the first pivot P1. It is to be noted that the various alternatives for the activation element 30 can be used with any of the embodiments described herein.

FIG. 2 discloses the locking device of FIG. 1 with the inner housing 13 removed to show the components of the locking device 10. A first follower 61 is mounted on the first pivot P1 and able to rotate around the activation element 30. The first follower 61 controls a position of the bolt 20 by providing a follower arm 68 with protrusions 67 that interact with corresponding protrusions 21 on the bolt 20 such that a rotation of the first follower 61 also causes a rotation of the bolt 20. The rotation takes place by the protrusions 67 engaging with corresponding protrusions 21.

The first follower 61 is in turn operated by a second follower 63 that acts to push the follower arm 68 by interaction of a follower protrusion 65 on walls of an opening 66. In the embodiments shown herein, the follower protrusion 65 is provided on the second follower 63 but it is also possible to provide the follower protrusion 65 on the first follower and the opening 66 in the second follower 63.

The first follower 61 is locked by a catch 62 that can be removed through movement of the second follower 63 or by any other suitable means.

The second follower 63 is operated either through a mechanical activation by rotation of the activation element 30 or through a non-mechanical activation by the actuator 40 acting on the cam 41 whose movement is coupled to the second follower 63 by a coupler 50. The mechanical activation takes place by an insertion of a key into the activation element 30 and a manual rotation of the key. During rotation, an activation element protrusion 31 is brought into contact with a first protrusion 64 that forces a movement of the second follower 63 and thereby also a movement of the first follower 61 that operates the bolt 20. The non-mechanical activation differs between the various embodiments and will be described below with reference to each embodiment. All the embodiments share the feature that the non-mechanical activation takes place by the actuator 40 causing a linear movement of the cam 41 and that said linear movement is transferred to the coupler 50 from which it is propagated to the second follower 63. This is done by the linear movement of the cam 41 being transferred into a rotational movement of the coupler 50 through engagement of protrusions of the cam 41 with protrusions of the rotating coupler 50. The rotation of the coupler 50 is in turn propagated to the second follower 63 by engagement of protrusions of the rotating coupler 50 with protrusions of the second follower 63.

All embodiments also share the feature that the second follower 63 is freely movable when activated by the mechanical activation through the activation element 30 in such a way that the movement of the second follower 63 is not coupled to the cam 41 via the coupler 50. This is achieved by a play Pin the coupler 50 or between the coupler 50 and the cam 41, the play P being arranged in such a way that movements from the cam 41 are always transferred to the second follower 63 whereas movements of the second follower is never transferred to the cam 41. This has the advantage that the mechanical activation of the locking device 10 never affects the actuator 40, thereby prolonging the lifetime of the actuator 40. The play P is created by a protrusion on one component extending into a space of another component, wherein the space is large enough that the protrusion can move a distance in the space without contacting a wall of the space and push against the wall and thereby move the component in which the space and its walls are arranged. In the following, alternatives are disclosed for the various embodiments for how the play P is created. It is to be noted that the protrusion may have a circular cross-section but that other shapes for the cross-section could also be used with substantially the same result as for a circular form.

The non-mechanical activation with the actuator 40, the cam 41 and the coupler 50 for coupling the movement from the actuator to the second follower 63 are together referred to as a control assembly 80. In the embodiments shown herein, the control assembly 80 differs depending on how the play P is realized but its function remains to transfer a movement from the actuator 40 to the second follower 63 and using the play P to prevent movement from being transferred from the second follower 63 to the actuator 40 when the locking device 10 is activated through mechanical activation.

One advantage of the present invention is that only two pivots, namely the first pivot P1 and the second pivot P2, are needed in order to perform both mechanical and non-mechanical activation of the bolt 20. This is beneficial in keeping losses due to friction to a minimum and allowing a larger part of the force applied at the activation element 30 or by the actuator 40 to the cam 41 to be transferred to the bolt 20, rendering the locking device stronger and the movements of the bolt 20 more precise. The embodiments using two pivots also provide the opportunity of using an activation element that is rotatable 360°, making them suitable for use as a locking device with high security where a key is rotatable through an entire revolution. The fourth embodiment described below has an even more compact construction using only one pivot (see below).

The catch 62 is not shown in FIG. 3*a* onwards, but this is only for the purpose of more clearly disclosing the operation of the locking device 10. The catch 62 of FIG. 1-2 may be applied to any of the subsequent embodiments and drawings and act to lock the locking device 10 and prevent unauthorized movement of the bolt 20.

FIG. 3*a*-3*d* disclose the preferred embodiment in more detail. In FIG. 3*a*, the locking device 10 is shown with the bolt 20 in the retracted position B and the second follower in a second end position D. This is an open position of the locking device. It has been reached by a mechanical activation with a rotation of the activation element 30 that moves the second follower 63 to rotate the first follower 61 in a clockwise direction and pivot the bolt 20 in a counterclockwise direction. The coupler 50 in this embodiment comprises a toothed wheel 51 that is in constant mesh with a rack on the second follower 63. The constant meshing of teeth from the toothed wheel with corresponding teeth on the rack will cause the toothed wheel to rotate as the second follower 63 moves and the toothed wheel 51 is arranged on a second pivot P2. The cam 41 is in FIG. 3*a* in a neutral position and has not moved through the mechanical activation and movement of the bolt 20 to the retracted position.

FIG. 3*b* discloses the same open position with the bolt 20 in the retracted position B and the second follower 63 in the second end position D. However, in FIG. 3*b* this has been achieved by a non-mechanical activation where the actuator 40 has acted on the cam 41 and caused a downward movement of the cam 41. The cam 41 comprises a rack that is in constant mesh with an activation wheel 71 that is arranged on the second pivot P2 together with the toothed wheel 51. The activation wheel 71 is coupled to the toothed wheel 51 by a wheel protrusion 72 on one of the wheels 51, 71 protruding into an opening 73 on the other of the wheels 51, 71 such that a rotation of the activation wheel 71 causes the wheel protrusion to contact a wall of the opening 73 and force a rotation of the toothed wheel 51. In this embodiment, the play P is thus formed by the wheel protrusion 72 being configured to move in the opening 73. Since the toothed wheel 51 is in constant mesh with the second follower 63, that rotation will be coupled to the second follower 63 and cause the movement that acts on the first follower 61 and forces the rotation of the bolt 20 to the retracted position. The wheel protrusion 72 may instead be arranged on the toothed wheel 51 and the opening 73 on the activation wheel 71.

In this embodiment, the coupler 50 comprises the toothed wheel 51, the activation wheel 71, the wheel protrusion 72 and the opening 73.

After the bolt 20 has been moved into the open position, the cam 41 is moved back to the neutral position shown in FIG. 3*a*. This does not affect the position of the bolt 20 since the play P formed by the opening 73 will act to allow the activation wheel 71 to move as the cam 41 goes to the neutral position without also rotating the toothed wheel 51.

It is to be noted that the non-mechanical activation to move the bolt 20 does not affect the activation element 30 so the mechanical and non-mechanical activations are completely independent of each other although they use the same components to operate the bolt 20. This is a major advantage of the present invention.

FIG. 3*c* discloses the locking device 10 with the bolt 20 in the extended position A, i.e. a locked position, with the second follower 63 in a first end position C. To reach this position, a key has been inserted into the activation element 30 and the activation element has been rotated in a counterclockwise direction so that the first protrusion 64 is contacted by the activation element protrusion 31 and the second follower 63 is moved in a direction towards the right-hand side of FIG. 3*c*. This causes the follower protrusion 65 to contact walls of the opening 66 so that the first follower is rotated in a counterclockwise direction to the position shown in FIG. 3*c*. This in turn causes a corresponding clockwise rotation of the bolt 20 from the open position of FIG. 3*a* to the locked position of FIG. 3*c*. During this movement, the toothed wheel 51 has been rotated as the second follower 63 moves due to the teeth of the toothed wheel 51 engaging with the rack of the second follower 63 but through the arrangement of the play P in the coupler 50 that rotation is not transferred to the activation wheel 71. Thus, the cam 41 is not affected by this movement where a mechanical activation has been used to extend the bolt 20.

In FIG. 3*d* the same locked position of the bolt 20 is shown, but it has now been achieved through the non-mechanical activation. Starting from FIG. 3*a* where the cam 41 is in the neutral position, the actuator 40 has acted to move the cam 41 linearly upwards in FIG. 3*d*. This causes a rotation of the activation wheel 71 which in turn makes the toothed wheel 51 rotate through contact between the wheel protrusion 72 and the opening 73. The wheel 51 rotating makes the second follower 63 move so that the first follower is pulled in the counterclockwise direction and the bolt 20 is extended into the position shown in FIG. 3*d*. Throughout this movement, the activation element 30 has not been affected.

After the position shown in FIG. 3*d* has been achieved, the cam 41 is moved back to the neutral position shown in FIG. 3*a*. This movement does not affect the bolt 20 since the movement of the cam 41 is not coupled to the toothed wheel 51 due to the play P between the activation wheel 71 and the toothed wheel 51.

FIG. 3*e*-3*f* show the activation wheel 71 and the toothed wheel 51, both individually so that the wheel protrusion 72 and the opening 73 are shown and together where the wheels 51, 71 are mounted so that the wheel protrusion 72 protrudes into the opening 73. The play P is provided in a second connection C2 in the coupler 50, i.e. between two coupler elements of the coupler 50 that in this embodiment are the toothed wheel 51 and the activation wheel 71.

It is advantageous that the cam 41 is moved back to the neutral position after each opening or locking of the locking device 10, since this adjusts the wheel protrusion 72 in the opening 73 so that a subsequent activation can be either a mechanical activation where the bolt 20 is moved without affecting the cam 41 or a non-mechanical activation where the cam 41 is able to transfer a movement to the toothed wheel 51 since the tooth protrusion 72 is in a correct position to be able to contact a wall of the opening 73.

The advantage to the toothed wheel 51 being in constant mesh with the second follower 63 and the activation wheel 71 being in constant mesh with the cam 41 lies in the smooth coupling of a movement from one component to the other so that the transfer of force is even and efficient. To provide the play P between the activation wheel 71 and the toothed wheel 51 has the advantage that a stable and reliable transfer of force can take place with low losses due to friction and with very low risk of malfunction.

FIG. 4*a*-4*c* disclose a second embodiment of the present invention. In the following, and also when describing subsequent embodiments, the same reference numerals as for the preferred embodiment above will be used for components that are similar or identical for the embodiments. The embodiments of the invention differ from each other mainly in the components and operation of the coupler 50.

Thus, FIG. 4*a* show the second embodiment in a locked position where the bolt 20 is extracted and the cam 41 is in the neutral position. The mechanical activation via the activation element 30 that controls the second follower 63 that operates the first follower 61 is identical to what is described above for the preferred embodiment. However, the non-mechanical activation differs in how the movement of the cam 41 is coupled to the second follower 63 and how the play P is arranged in the coupler 50.

The coupler 50 comprises the toothed wheel 51 that is arranged on the second pivot P2 in constant mesh with the rack of the second follower 63, but a third follower 52 is also provided and arranged in constant mesh with the toothed wheel 51. Thus, when the second follower 63 moves, a pivoting of the toothed wheel 51 and a linear movement of the third follower 52 will also take place.

The play P is in this embodiment provided in a first connection C1 between the cam 41 and the coupler 50 (see FIG. 4*e*). The cam 41 comprises a cam protrusion 42 and the third follower 52 comprises an opening 53 into which the cam protrusion 42 extends and this opening 53 provides the play P that enables independent movement of the third follower 52 in relation to the cam 41 during mechanical activation of the locking device 10. It should be noted that the cam protrusion 42 could instead be a protrusion on the third follower 52 and that the opening 53 in the third follower 52 could instead be an opening in the cam 41.

FIG. 4*b* discloses the open position where the bolt 20 is in the retracted position. This has been achieved through mechanical activation where the activation element 30 has acted to bring the second follower 63 to its second position and the toothed wheel 51 and the third follower 52 have moved together with the second follower 63. However, this has not resulted in a corresponding movement of the cam 41 due to the presence of the play P in the first connection C1 (see FIG. 4*d*) between the third follower 52 and the cam 41.

FIG. 4*c* instead shows the same open position but it has been reached through a non-mechanical activation in which the actuator 40 has moved the cam 41 downwards in the Figure. Through this movement, the cam 41 has pulled the third follower 52 downwards as well, resulting in a rotation of the toothed wheel 51 and the movement of the second follower 63 to its second position. After the open position has been reached through the non-mechanical activation, the cam 41 is returned to the neutral position.

For each embodiment described herein, the cam 41 being in the neutral position adjusts the components in such a way that the play P is arranged so that a non-mechanical activation to move the bolt 20 from its current position is effective by the protrusion contacting a wall of the opening and moving the components so that the follower arm of the first follower 61 operates the bolt 20. However, the neutral position of the cam 41 also means that the play P is arranged such that a mechanical activation results in the bolt 20 being moved without the protrusion contacting a wall of the opening so that the mechanical operation does not affect the cam 41 and the actuator. It is therefore advantageous that the cam 41 is returned to the neutral position as soon as the non-mechanical activation has resulted in the desired movement of the bolt 20.

FIG. 4*d* discloses the locking device 10 of FIG. 4*a*-4*c* from the side to show more clearly the first connection C1 between the cam 41 and the third follower 52. The cam protrusion 42 is shown in a position where it is in contact with a wall of the opening 53 and is thus able to act on the third follower 52 directly by pulling it downwards in the Figure. However, any downward movement of the third follower 52 will only allow the cam protrusion 42 to move in the opening 53 and there is no contact between the protrusion and a wall of the opening 53 until the downward movement has allowed the cam protrusion 42 to move along the opening 53 to contact an upper wall.

FIG. 4*e* shows an exploded view where the cam 41 with the cam protrusion 42, the third follower 52 with the opening 53 and the toothed wheel 51, second follower 63 and activation element 30 are shown in more detail.

FIG. 5*a*-5*d* show a third embodiment where the coupler 50 differs from the other embodiments in the toothed wheel 51 comprising a second wheel protrusion 54 that extends into a cam opening 43 provided on the cam 41. Other features than the coupler 50 is similar or identical to the other embodiments described above.

In this embodiment, the toothed wheel 51 only has teeth along part of its circumference but it is still in constant mesh with the second follower 63. The play P is provided in the form of the second wheel protrusion 54 extending into the cam opening 43 so that the toothed wheel 51 cam move independently of the cam 41 when activated by the mechanical activation, but that the cam 41 can operate the toothed wheel 51 by the second wheel protrusion 54 contacting a wall of the opening 43 when non-mechanical activation takes place. FIG. 5*a* shows an open position where the bolt 20 is retracted, either by mechanical activation or by non-mechanical activation where the cam 41 has already been returned to the neutral position. FIG. 5*b* shows the same position from behind, to show the position of the second wheel protrusion 54 in relation to the cam opening 43 on the cam.

FIG. 5*c* shows the retracted position of the bolt 20 where the retraction has been made through the non-mechanical operation so that the cam 41 is moved downwards in the Figure and operates the toothed wheel 51 by the second wheel protrusion 54 contacting a wall of the cam opening 43. In FIG. 5*c*, the cam 41 has not yet been returned to the neutral position of FIGS. 5*a* and 5*b*.

FIG. 5*d* shows the extended position of the bolt 20 where the extending has taken place by non-mechanical activation so that the cam 41 is moved upwards in the Figure and the second wheel protrusion 54 is contacted by a lower wall of the cam opening 43 so that the toothed wheel 51 is rotated to operate the second follower 63.

Each of the preferred, second and third embodiment can comprise an activation element 30 that is rotatable 360°, but alternatively they could instead use an activation element 30 that is rotatable only 90°.

FIG. 6*a*-6*c* disclose a fourth embodiment of the invention that differs from the embodiments above in how the coupler 50 is realized. The fourth embodiment is also even more compact than those described above and comprises only two pivots, the Third pivot P3 on which the bolt 20 is arranged and the first pivot P1 on which the activation element 30 and the first follower 61 are arranged. FIG. 6*a* shows an extended position of the bolt 20 and the cam 41 in its neutral position.

The coupler 50 in this embodiment comprises a toothed portion 56 on the circumference of the activation element 30 and a fourth follower 55 that is in constant mesh with the toothed portion 56 so that a rotation of the activation element is always coupled to the fourth follower 55. In this embodiment, both the mechanical activation and the non-mechanical activation function by rotating the activation element 30 so that the activation element protrusion 31 contacts the first protrusion 64 and the second follower 63 moves to operate the first follower 61.

The play P is provided in a first connection C1 between the cam 41 and the coupler 50, in this embodiment realized through a cam protrusion 42 on the cam 41 and an opening 53 on the fourth follower 53.

FIG. 6*b* shows the open position with the bolt 20 in the retracted position through non-mechanical activation of the locking device 10. Thus, the cam 41 has moved downwards in the Figure so that the fourth follower 55 is pulled down and the activation element 30 rotated to operate the second follower 63.

FIG. 6*c* shows a perspective view of the coupler 50 with the activation element 30 and the cam 41 to more clearly illustrate its operation. Like the embodiments described above, the protrusion could instead be provided on the fourth follower 55 and the opening on the cam 41.

It is to be noted that features from the various embodiments described herein may freely be combined, unless it is explicitly stated that such a combination would be unsuitable.

The invention claimed is:

1. Locking device for independently operating a bolt by a mechanical activation and a non-mechanical activation, comprising a bolt (20) movable between an extended position in a locked state and a retracted position in an unlocked state, a first follower (61) for operating the bolt (20), the first follower (61) being pivotable on a first pivot (P1) and comprising a follower arm (68) configured to engage the bolt (20) and move it between the extended position and the retracted position, a second follower (63) for operating the first follower (61) and thereby also the bolt (20), the second follower (63) being configured to contact the first follower (61) and move the follower arm (68), an activation element (30) for mechanical activation of the bolt (20), said activation element (30) being rotatable and configured to operate the second follower (63), and a control assembly (80) for non-mechanical activation of the bolt (20), the control assembly (80) comprising an actuator (40), a cam (41) operated by the actuator (40) and a coupler (50) for coupling a movement of the cam (41) to the second follower (63) and thereby operate the second follower (63), wherein the control assembly (80) comprises a play (P) such that the second follower (63) when operated by the activation element (30) is configured to move freely in relation to the cam (41), and the first pivot (P1) is the activation element (30) such that the first follower (61) is configured to rotate about the activation element (30), and the coupler (50) comprises two coupler elements (51, 71) that form a second connection (C2), said second connection (C2) comprising the play (P).

2. Locking device according to claim 1, wherein the cam (41) is connected to the coupler (50) by a first connection (C1), said first connection (C1) comprising the play (P).

3. Locking device according to claim 1, wherein the play (P) is configured to allow a movement of the second follower (63) from a first end position (C) to a second end position (D) and from the second end position (D) to the first end position (C) independently of the cam (41), and the first end position (C) is a position corresponding to an extended position (A) of the bolt and the second end position (D) is a position corresponding to a retracted position (B) of the bolt (20).

4. Locking device according to claim 1, wherein the activation element (30) is configured to operate the second follower (63) by being coupled to the second follower (63) such that a rotation of the activation element (30) engages the second follower (63) and causes a corresponding movement of the second follower (63).

5. Locking device according to claim 1, wherein the play (P) of the control assembly (80) comprises an opening and a protrusion configured to extend into the opening, the opening and the protrusion being arranged on different parts of the control assembly (80), and the opening being larger than the protrusion such that the protrusion can move in relation to the opening without contacting walls of the opening.

6. Locking device for independently operating a bolt by a mechanical activation and a non-mechanical activation, comprising a bolt (20) movable between an extended position in a locked state and a retracted position in an unlocked state, a first follower (61) for operating the bolt (20), the first follower (61) being pivotable on a first pivot (P1) and comprising a follower arm (68) configured to engage the bolt (20) and move it between the extended position and the retracted position, a second follower (63) for operating the first follower (61) and thereby also the bolt (20), the second follower (63) being configured to contact the first follower (61) and move the follower arm (68), an activation element (30) for mechanical activation of the bolt (20), said activation element (30) being rotatable and configured to operate the second follower (63), and a control assembly (80) for non-mechanical activation of the bolt (20), the control assembly (80) comprising an actuator (40), a cam (41) operated by the actuator (40) and a coupler (50) for coupling a movement of the cam (41) to the second follower (63) and thereby operate the second follower (63), wherein the control assembly (80) comprises a play (P) such that the second follower (63) when operated by the activation element (30) is configured to move freely in relation to the cam (41), the first pivot (P1) is the activation element (30) such that the first follower (61) is configured to rotate about the activation element (30), and the coupler (50) comprises a toothed wheel (51) rotatable on a second pivot (P2) and the second follower (63) comprises a rack that is arranged in constant mesh with the toothed wheel (51).

7. Locking device according to claim 6, wherein the coupler (50) also comprises an activation wheel (71) arranged on the second pivot (P2) and configured to operate the toothed wheel (51) to control the second follower (63) and thereby the follower arm (68) of the first follower (61), said activation wheel (71) being arranged in constant mesh with the cam (41), the toothed wheel (51) and the activation wheel (71) are connected to each other in a second connection (C2) by one of them comprising a wheel protrusion (72) and the other comprising an opening (73) into which the wheel protrusion (72) extends when the toothed wheel (51) and the activation wheel (71) are mounted together on the second pivot (P2), the wheel protrusion (72) and opening (73) are arranged in such a way that a rotation of the activation wheel (71) causes the wheel protrusion (72) to contact a wall of the opening (73) and thereby rotates the toothed wheel (51), and the opening (73) forms the play (P) such that the toothed wheel (51) can rotate driven by a mechanical activation of the first follower (61) without causing the activation wheel (71) to also rotate.

8. Locking device according to claim 6, wherein the coupler (50) further comprises a third follower (52) comprising a rack and being arranged in constant mesh with the toothed wheel (51), the third follower (52) is connected to the cam (41) in a first connection (C1) by one of them comprising a protrusion (42) and the other comprising an opening (53) into which the protrusion (42) extends when the third follower (52) and the cam (41) are arranged together, the protrusion (42) and opening (53) are arranged in such a way that a linear movement of the cam (41) causes the protrusion (42) to contact a wall of the opening (53) and thereby causes a linear movement of the third follower (52), and the opening (53) forms the play (P) such that the third follower (52) can move linearly driven by a mechanical activation of the first follower (61) without causing the cam (41) to move also.

9. Locking device according to claim 6, wherein the toothed wheel (51) and the cam (41) are connected in a first connection (C1) by one of them comprising a second wheel protrusion (54) and the other comprising an opening (43) into which the second wheel protrusion (54) extends when the toothed wheel (51) is arranged on the second pivot (P2) and the cam (41) is arranged beside the toothed wheel (51), the second wheel protrusion (54) and the opening (43) are arranged in such a way that a linear movement of the cam (41) causes the second wheel protrusion (54) to contact a wall of the opening (43) and thereby causes a rotation of the toothed wheel (51), and the opening (43) forms the play (P) such that the toothed wheel (51) can rotate driven by a mechanical activation of the first follower (51) without causing the cam (41) to move also.

10. Locking device for independently operating a bolt by a mechanical activation and a non-mechanical activation, comprising a bolt (20) movable between an extended position in a locked state and a retracted position in an unlocked state, a first follower (61) for operating the bolt (20), the first follower (61) being pivotable on a first pivot (P1) and comprising a follower arm (68) configured to engage the bolt (20) and move it between the extended position and the retracted position, a second follower (63) for operating the first follower (61) and thereby also the bolt (20), the second follower (63) being configured to contact the first follower (61) and move the follower arm (68), an activation element (30) for mechanical activation of the bolt (20), said activation element (30) being rotatable and configured to operate the second follower (63), and a control assembly (80) for non-mechanical activation of the bolt (20), the control assembly (80) comprising an actuator (40), a cam (41) operated by the actuator (40) and a coupler (50) for coupling a movement of the cam (41) to the second follower (63) and thereby operate the second follower (63), wherein the control assembly (80) comprises a play (P) such that the second follower (63) when operated by the activation element (30) is configured to move freely in relation to the cam (41), the first pivot (P1) is the activation element (30) such that the first follower (61) is configured to rotate about the activation element (30), and the coupler (50) comprises a toothed section on the activation element (30), and a fourth follower (55) comprising a rack and being arranged in constant mesh with the toothed section on the activation element (30), the fourth follower (55) is connected to the cam (41) in a first connection (C1) by one of them comprising a protrusion (42) and the other comprising an opening (53) into which the protrusion (42) extends when the fourth follower (55) and the cam (41) are arranged together, the protrusion (42) and opening (53) are arranged in such a way that a linear movement of the cam (41) causes the protrusion (42) to contact a wall of the opening (53) and thereby causes a linear movement of the fourth follower (55), and the opening (53) forms the play (P) such that the fourth follower (55) can move linearly driven by a mechanical activation of the activation element (30) without causing the cam (41) to move also.

* * * * *